(12) United States Patent
Werquin

(10) Patent No.: US 11,104,417 B2
(45) Date of Patent: Aug. 31, 2021

(54) DEVICE FOR CONTROLLING THE FLIGHT OF AN AIRCRAFT

(71) Applicant: SAFRAN ELECTRONICS & DEFENSE, Paris (FR)

(72) Inventor: Mickael Werquin, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/269,464

(22) PCT Filed: Aug. 19, 2019

(86) PCT No.: PCT/EP2019/072126
§ 371 (c)(1),
(2) Date: Feb. 18, 2021

(87) PCT Pub. No.: WO2020/048757
PCT Pub. Date: Mar. 12, 2020

(65) Prior Publication Data
US 2021/0197959 A1    Jul. 1, 2021

(30) Foreign Application Priority Data

Sep. 4, 2018 (FR) ..................................... 18 57941

(51) Int. Cl.
*B64C 13/04* (2006.01)
(52) U.S. Cl.
CPC .................................. *B64C 13/042* (2018.01)
(58) Field of Classification Search
CPC .................................................. B64C 13/042
See application file for complete search history.

(56) References Cited

U.S. PATENT DOCUMENTS

| 10,293,919 | B2 * | 5/2019 | Gomolko | ............... G05G 9/047 |
| 2015/0014480 | A1 * | 1/2015 | Lebernicheux | ......... F16D 7/044 |
| | | | | 244/99.3 |
| 2016/0252926 | A1 * | 9/2016 | Gomolko | ............ B64C 13/0421 |
| | | | | 244/234 |
| 2017/0131737 | A1 * | 5/2017 | Fremiot | ................. G05G 9/047 |
| 2018/0134404 | A1 * | 5/2018 | Granier | ................. B64C 13/506 |

FOREIGN PATENT DOCUMENTS

| FR | 2954835 A1 | 7/2011 |
| FR | 3011815 A1 | 4/2015 |

* cited by examiner

*Primary Examiner* — Justin M Benedik
(74) *Attorney, Agent, or Firm* — Muncy, Geissler, Olds & Lowe, P.C.

(57) ABSTRACT

A device includes a lever associated with a body carrying a plate that is connected to the body by a pivot connection for pivoting about a first axis, the lever being connected to the plate by a pivot connection for pivoting about a second axis, a first transmission shaft and a first connection mechanism for connecting the lever to the first transmission shaft, a second transmission shaft and a second connection mechanism for connecting the control lever to the second shaft. The first shaft and the first connection mechanism are connected together by a pivot connection for pivoting about a fifth axis that is inclined relative to the first axis and to the third axis, and the second shaft and the second connection mechanism are connected together by a pivot connection for pivoting about a sixth axis that is inclined relative to the second axis and to the fourth axis.

8 Claims, 2 Drawing Sheets

DEVICE FOR CONTROLLING THE FLIGHT OF AN AIRCRAFT

TECHNOLOGICAL BACKGROUND OF THE INVENTION

Aircraft flight control devices usually comprise a control lever that is pivotally mounted on the body of the control device to pivot about at least two mutually perpendicular axes in order to be able to control rolling and pitching movements of the aircraft. For this purpose, the control lever is mechanically or electrically connected to one or more aircraft control members such as control surfaces.

In order to assist the pilot in controlling the aircraft in rolling and in pitching, flight control devices are known that include control motors associated with the lever so that for each pivoting movement of the lever relative to the body, one of the motors serves to simulate force return to the pilot operating the lever. The lever can thus be handled easily and without effort by the pilot.

By way of example, document FR-A-2 954 835 discloses a control device including two electromagnetic actuators associated with the control lever in order to simulate a return force for each pivoting movement of the lever relative to the body.

Nevertheless, the electromagnetic actuators are then incorporated directly within the body of the control device such that the control device becomes bulky. This is particularly troublesome for aircraft having cockpits of small size, such as helicopters, since the control device can hinder the pilot.

In document FR 3 011 815, the present applicant proposes an improved flight control device that can in particular be installed more easily in cockpits of small size.

Nevertheless, with the main architecture shown in that document, the force felt from the control lever in order to pivot about the second pivot axis Y differs depending on whether the control lever is also being inclined to right or to left about the first pivot axis X.

In order to mitigate that drawback, proposals have been made to have recourse to servocontrol that is particular in that it causes the force felt from the control lever while it is being pivoted about the second pivot axis Y, to be symmetrical regardless of whether or not the control lever is also being inclined to left or to right.

Nevertheless, that makes it necessary to develop such particular servocontrol that limits the use that can be made of the motors involved.

OBJECT OF THE INVENTION

An aim of the invention is to propose a flight control device that obviates the above-mentioned drawback, at least in part.

BRIEF DESCRIPTION OF THE INVENTION

In order to achieve this aim, there is provided an aircraft flight control device comprising a control lever associated with a body carrying:
- a plate connected to the body by a first pivot connection for pivoting about a first axis, the control lever being connected to the plate by a second pivot connection for pivoting about a second axis that intersects the first axis;
- a first transmission shaft mounted to pivot relative to the body about a third axis and connected to at least one first control motor outside the body;
- a first connection mechanism connecting the control lever to the first transmission shaft in such a manner that pivoting the control lever about the first axis causes the first shaft to pivot about the third axis;
- a second transmission shaft mounted to pivot relative to the body about a fourth axis and connected to at least one second control motor outside the body; and
- a second connection mechanism connecting the control lever to the second shaft in such a manner that pivoting the control lever about the second axis causes the second shaft to pivot about the fourth axis;
- the first shaft and the first connection mechanism being connected to each other by a pivot connection for pivoting about a fifth axis that is inclined relative to the first axis and to the third axis; and the second shaft and the second connection mechanism are connected to each other about a pivot connection for pivoting about a sixth axis that is inclined relative to the second axis and to the fourth axis.

According to the invention, the plate is shaped in such a manner that, when the control lever is in a neutral position, the angle between the second axis and the sixth axis is strictly greater than the complement of the angle between the fourth axis and the sixth axis.

By having such a particular shape for the flight control device, it is possible to omit (at least in part) particular servocontrol for making symmetrical the return force felt from the control lever when pivoting about the second pivot axis, regardless of whether or not the control lever is inclined about the first pivot axis.

Advantageously, such a solution is also simple to implement.

In the present application, an axis A is said to be "inclined" relative to an axis B when the axis A is neither parallel nor perpendicular to the axis B.

Preferably, the angle between the second axis and the sixth axis is greater than or equal to 75° when the control lever is in the neutral position.

Preferably, the angle between the second axis and the sixth axis lies in the range 75° to 100°.

Optionally, the angle between the second axis and the sixth axis lies in the range 75° to 90°.

BRIEF DESCRIPTION OF THE DRAWINGS

The invention can be better understood in the light of the following description of a nonlimiting embodiment of the invention given with reference to the accompanying figures, in which.

DETAILED DESCRIPTION OF THE INVENTION

Figure 1:
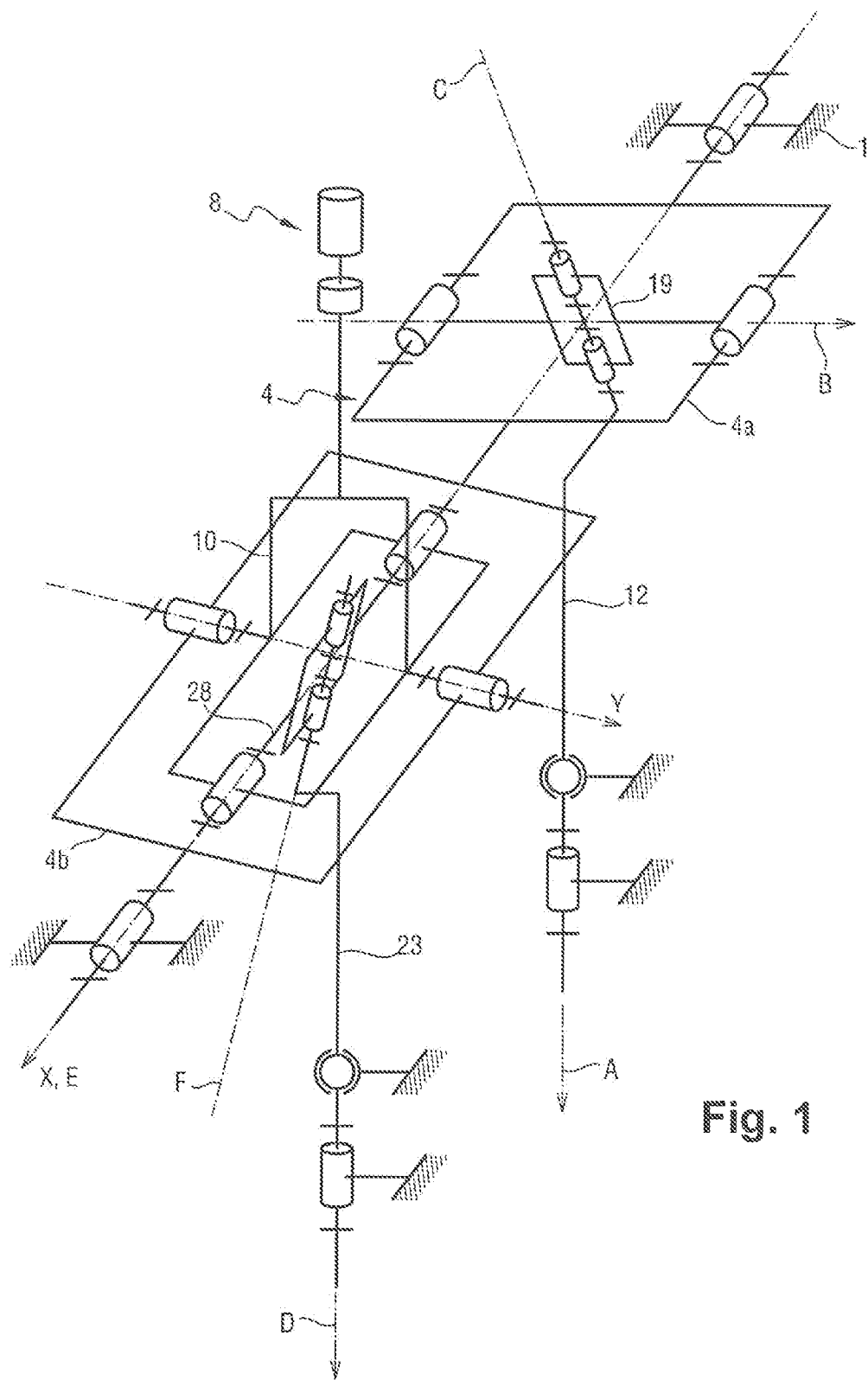
FIG. 1 is a diagram of a flight control device in a particular embodiment of the invention.
Figure 2:
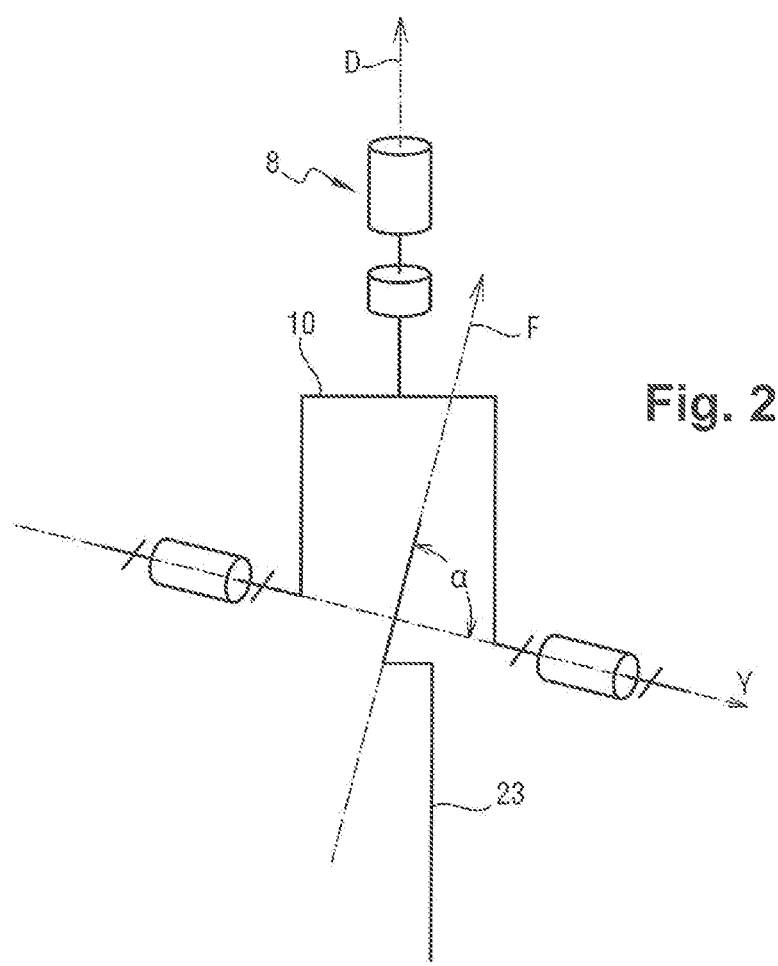
FIG. 2 is a portion of the diagram shown in FIG. 1.

With reference to FIGS. 1 and 2, the flight control device in the particular embodiment of the invention includes a body 1. In particular manner, the body 1 extends longitudinally and includes a floor 2 and at least two mutually opposite side walls, both extending vertically from the floor 2.

The device further includes a first plate 4. The first plate 4 comprises a first frame 4a and a second frame 4b that are stationary relative to each other. By way of example, the two frames 4a and 4b may comprise a single part, or else they may be two parts that are rigidly secured to each other. Together, the two frames have the general shape of a chassis having substantially the same length as the body 1. Nevertheless, the two frames 4a and 4b extend obliquely relative to each other. Thus, although the two frames 4a and 4b extend longitudinally along the first axis X, the second frame and 4b extends laterally in a manner that is inclined relative to the first frame 4a. Typically, the first frame 4a extends substantially parallel to the floor of the body 1, while the second frame 4b is inclined relative to the floor. The first plate 4 thus has the shape of a twisted chassis.

The first plate 4 is directly connected to the body 1 by a first pivot connection for pivoting about the first pivot axis X. Typically, the first frame 4a is pivotally mounted on one of the side walls of the body 1 and the second frame 4b is pivotally mounted on the other side wall of the body 1.

The device further includes a control lever 8 that is associated with the body 1 and, in this example, the lever comprises both a stick forming a free end of the control lever and also a second plate 10, which in this example is integral with the stick.

The second plate 10 (and thus also the control lever 8) is directly connected to the second frame 4b of the first plate 4 by a second pivot connection for pivoting about a second pivot axis Y, with the second axis Y intersecting the first axis X. It should be observed that the second axis Y is connected to the first plate 4, i.e. pivoting the first plate 4 about the first axis X causes the second axis Y to pivot about the first axis X.

The device includes a first transmission shaft 12 that is directly connected to the body 1 by a third pivot connection for pivoting about a third pivot axis A.

In this example, the first transmission shaft 12 is arranged in such a manner that the third axis A intersects the first axis X.

The first shaft 12 has a first end. The first end comprises a terminal portion that is straight and a connection portion that is bent connecting the straight terminal portion to the second end of the second shaft. The straight terminal portion of the first end thus extends obliquely relative to the third axis A and to the second end of the second transmission shaft.

The second end of the first shaft 12 is connected to a first group of motors (not shown), which group is outside the body.

The device also includes a first connection mechanism connecting the control lever 8 to the first transmission shaft 12 in such a manner that pivoting the control lever 8 about the first axis X causes the first transmission shaft 12 to pivot about the third axis A.

Preferably, the first connection mechanism connects the first transmission shaft 12 to the control lever 8 via a Cardan joint.

In this example, the first connection mechanism thus includes a first spider 19 comprising two crossed branches that extend perpendicularly relative to each other.

In particular manner, the first connection mechanism is directly connected to the first frame 4a by a fourth pivot connection for pivoting about a fourth pivot axis B. For this purpose, a first branch of the first spider 19 is pivotally mounted on the first frame 4a to pivot about said fourth pivot connection for pivoting about the fourth pivot axis B. The first spider 19 is arranged in such a manner that the fourth axis B is concurrent both with the first axis X and with the third axis A.

As a result, the first transmission shaft 12 is arranged so that the third axis A is normal to a plane containing the first axis X and the fourth axis B when the control lever 8 is in a neutral position.

In this example, the second branch of the first spider 19 is provided with a central bore extending along the entire length of the second branch. The first transmission shaft 12 is directly connected to the first spider 19 by a fifth pivot connection for pivoting about a fifth pivot axis C. For this purpose, the straight terminal portion of the first transmission shaft 12 extends inside the second branch and is pivotally mounted in the central bore of the second branch by means of two bearings lying on the same axis.

The device is arranged in such a manner that the fifth axis C is inclined relative to the first axis X, to the third axis A, and to the fourth axis B, and intersects the first axis X, the third axis A, and the fourth axis B. In this example, the first transmission shaft 12 is shaped in such a manner that the straight terminal portion extends at 250 relative to the second end of the first transmission shaft 12, with the fifth axis C then extending in this example at 25° relative to the third axis A.

As a result of the particular bent shape of the first transmission shaft 12, it is thus possible to have a pivot connection between the first shaft 12 and the first connection mechanism, which has its axis inclined in particular relative to the first axis X and to the third axis A.

Torque is thus transmitted between the control lever 8 and the first transmission shaft 12 via the first spider 19 and the first plate 4 (and in particular in this example via the first frame 4a and the second frame 4b). When the pilot moves the control lever 8 about the first pivot axis X, the first plate 4 is also caused to pivot relative to the body 1 about the first pivot axis X, thereby acting via the Cardan joint created by the first spider 19 to cause the first transmission shaft 12 to pivot about the third axis A.

The device includes a second transmission shaft 23 directly connected to the body 1 by a sixth pivot connection for pivoting about a sixth pivot axis D.

In this example, the second transmission shaft 23 is arranged in such a manner that the sixth axis D intersects the first axis X and the second axis Y. As a result, the second transmission shaft 23 is arranged so that, when the control lever 8 is in its neutral position, the sixth axis D is normal to a plane containing both the first axis X and the fourth axis B.

The sixth axis D is thus parallel to the third axis A.

The second shaft 23 has a first end. The first end comprises a terminal portion that is straight and a connection portion that is bent connecting the straight terminal portion to the second end of the second shaft 23. The straight terminal portion of the first end thus extends obliquely relative to the sixth axis D and to the second end.

The second end of the second shaft 23 is connected to a second group of motors (not shown), which group is outside the body.

The device also includes a second connection mechanism connecting the control lever 8 to the second transmission shaft 23 in such a manner that pivoting the control lever 8 about the second axis Y causes the second transmission shaft 23 to pivot about the sixth axis D.

Preferably, the second connection mechanism connects the second transmission shaft 23 to the control lever 8 via a Cardan joint.

In this example, the second connection mechanism includes a second spider 28 comprising two crossed branches that extend perpendicularly relative to each other.

In particular manner, the second connection mechanism is directly connected to the second plate 10 by a seventh pivot connection for pivoting about a seventh pivot axis E, which in this example coincides with the first pivot axis X. For this purpose, a first end of the first branch of the second spider 28 is pivotally mounted on the second plate 10 by said seventh pivot connection for pivoting about the seventh pivot axis E.

In this example, the second branch of the second spider 28 is provided with a central bore extending along the entire length of the second branch. The second transmission shaft 23 is directly connected to the second spider 28 by an eighth pivot connection for pivoting about an eighth pivot axis F. For this purpose, the terminal portion of the second transmission shaft 23 extends inside the second branch and is pivotally mounted in the central bore of the second branch by means of two bearings lying on the same axis.

The device is arranged in such a manner that the eighth axis F is inclined relative to the first axis X, to the second axis Y, and to the sixth axis D, and intersects the first axis X, the second axis Y, and the sixth axis D. In this example, the second transmission shaft 23 is shaped in such a manner that the terminal portion extends at 250 relative to the second end of the transmission shaft 23, the eighth axis F then thus extending in this example at 25° relative to the sixth axis D.

As a result of the particular bent shape of the second transmission shaft 23, it is thus possible to have a pivot connection between the second shaft 23 and the second connection mechanism, which has its axis inclined in particular relative to the second axis Y and to the sixth axis D.

Torque is thus transmitted between the control lever 8 and the second transmission shaft 23 solely via the second spider 28. When the pilot moves the control lever 8 about the second pivot axis Y, that acts via the Cardan joint created by the second spider 28 to cause the second transmission shaft 23 to pivot about the sixth axis D. Nevertheless, that does not cause the first pivot shaft 12 to pivot about the third axis A.

In contrast, it should be observed that when the pilot moves the control lever 8 about the first pivot axis X, that gives rise not only to the first transmission shaft 12 pivoting about the third axis A, but also to the second transmission shaft 23 pivoting about the sixth axis D, thus giving rise to coupling.

In order to limit the effects of such coupling as much as possible, the second frame 4b of the plate is shaped in such a manner that an angle α between the second axis Y and the eighth axis F is strictly greater than the complement of the angle that extends between the sixth axis D and the eighth axis F when the control lever 8 is in the neutral position.

When the control lever 8 is being pivoted about the second axis Y, which corresponds to controlling pitching, this makes it possible, in natural manner, to cause the force felt from the lever to be made symmetrical, at least in part, regardless of whether or not the control lever 8 is being pivoted about the first axis X, which corresponds to controlling rolling.

In the present example, said complement is equal to 155°, since the angle between the sixth axis D and the eighth axis F is equal to 25°. In this example, the angle α between the second axis Y and the eighth axis F must thus be strictly greater than 155° when the control lever 8 is in the neutral position.

Advantageously, the twisted shape of the first plate 4 ensures that with this inclination of the second frame 4b the problem of asymmetry is not transferred to the first axis X. At the first frame 4a, the fourth axis B is indeed perpendicular to the first axis X.

Thus, the device in this particular embodiment of the invention has only eight pivot connections and only six main elements (the first transmission shaft 12, the second transmission shaft 23, the first spider 19, the second spider 28, the first plate 4, and the control lever 8) while nevertheless enabling a respective group of motors to be associated with pivoting movement of the control lever 8 relative to the body 1. The device in this particular embodiment of the invention is thus indeed of simplified structure.

Also, the various elements of the device are connected to one another solely by means of bearings. This enables the device to be simplified and made more reliable. Specifically, this avoids using gearing that might seize or belts that might break.

Preferably, the device is arranged in such a manner that the first axis X, the second axis Y, the sixth axis D, and the eighth axis F are all concurrent at a first point, and the first axis X, the third axis A, the fourth axis B, and the fifth axis C are all concurrent at a second point.

Thus, the various rotation axis of the device are concurrent at only two points, thus making it possible to have a device that is particularly compact.

Naturally, the invention is not limited to the embodiment described, and variants may be applied thereto without going beyond the ambit of the invention as defined by the claims.

In particular, although above the control lever is connected to two groups of control motors, it is possible to envisage the control lever being connected to a third control motor (or to a third group of control motors) for turning the control lever about an axis intersecting the first axis and the second axis and normal to the plane formed by the first axis and the fourth axis when the control lever is in its neutral position.

The term "neutral position" should generally be understood as the position of the control lever in which no force is exerted on the control lever, such that if the device is standing on a plane surface, then the plane formed by the first axis and the fourth axis is parallel to said surface. Thus, in the neutral position, the control lever is typically not inclined about either of the first and second axes.

Although in the particular embodiment of the invention, the transmission shafts are connected directly to the output shafts of the corresponding groups of motors, in a variant the transmission shafts could be connected to said output shafts via motion transmission devices.

Although in the particular embodiment of the invention, the bent portion of each of the transmission shafts extends at 250 relative to the remainder of the corresponding transmission shaft, the bent portion could be shaped in such a manner that the fifth axis (or the eighth axis) extends relative to the third axis (or to the sixth axis) at some other angle. Likewise, the angles of the bent portions of the transmission shafts of the particular embodiment of the invention could be adapted so as to obtain a desired angle of inclination for the fifth axis or for the eighth axis. In general manner, the particular shapes of the connection mechanisms and/or of the transmission shafts may be chosen to adapt the angles of inclination of the fifth axis and of the eighth axis.

In particular, at least the angle between the eighth axis and the sixth axis depends on the amplitude desired for the control lever. By way of example, this angle may lie in the range 10° to 65° for a control lever having an amplitude lying in the range 5° (in absolute value) to 30° (in absolute value).

Consequently, the angle between the second axis and the eighth axis could equally well be different from the description above, providing it is strictly greater than the complement of the angle between the eighth axis and the sixth axis. For example, the angle between the second axis and the eighth axis could be greater than or equal to 75° when the control lever is in the neutral position. Optionally, the angle between the second axis and the eighth axis may lie in the range 75° to 100°. Also optionally, the angle between the second axis and the eighth axis may lie in the range 750 to 90°.

Preferably, it is desirable to be as close as possible to a theoretically optimum angle (while taking production feasibility into account), which theoretically optimum angle depends not only on the angle between the sixth axis and the eighth axis, but also on the desired amplitude for the control lever. When the control lever is being pivoted about the second axis Y, which corresponds to controlling pitching, this makes it possible, in natural manner, to cause the force felt from the lever to be made as symmetrical as possible, at least in part, regardless of whether or not the control lever is being pivoted about the first axis X, which corresponds to controlling rolling.

By way of example, this optimum may lie in the range 75° to 90°, and preferably in the range 78° to 86°, for the control lever having an amplitude lying in the range 5° (in absolute value) to 30° (in absolute value).

Naturally, throughout the present application, whenever two parts are pivotally mounted relative to each other, that may be done either directly (the two parts then being in contact) or else via other parts.

Either one of the parts connected together by a pivot connection may carry the bearing(s) or any other means needed for providing the pivot connection between the two parts.

The transmission shafts may be pivotally mounted relative to the body to pivot about the third axis and about the sixth axis by being guided and pivotally mounted directly on the body or by being guided and pivotally mounted on the stator of the corresponding control motor.

Other arrangements could be envisaged.

The invention claimed is:

1. An aircraft flight control device comprising a control lever associated with a body carrying:
   - a plate connected to the body by a first pivot connection for pivoting about a first axis, the control lever being connected to the plate by a second pivot connection for pivoting about a second axis intersecting the first axis;
   - a first transmission shaft mounted to pivot relative to the body about a third axis and connected to at least one first control motor outside the body;
   - a first connection mechanism connecting the control lever to the first transmission shaft in such a manner that pivoting the control lever about the first axis causes the first shaft to pivot about the third axis;
   - a second transmission shaft mounted to pivot relative to the body about a fourth axis and connected to at least one second control motor outside the body; and
   - a second connection mechanism connecting the control lever to the second shaft in such a manner that pivoting the control lever about the second axis causes the second shaft to pivot about the fourth axis;
   - the first shaft and the first connection mechanism being connected to each other by a pivot connection for pivoting about a fifth axis that is inclined relative to the first axis and to the third axis; and the second shaft and the second connection mechanism being connected to each other about a pivot connection for pivoting about a sixth axis that is inclined relative to the second axis and to the fourth axis;
   - wherein the plate is shaped in such a manner that, when the control lever is in a neutral position, the angle between the second axis and the sixth axis is strictly greater than the complement of the angle between the fourth axis and the sixth axis.

2. The device according to claim 1, wherein the angle between the second axis and the sixth axis is greater than or equal to 75° when the control lever is in the neutral position.

3. The device according to claim 2, wherein the angle between the second axis and the sixth axis lies in the range 75° to 100° when the control lever is in the neutral position.

4. The device according to claim 3, wherein the angle between the second axis and the sixth axis lies in the range 75° to 90° when the control lever is in the neutral position.

5. The device according to claim 1, wherein the plate comprises a first frame and a second frame that are inclined relative to each other, the first shaft being associated with the first frame and the second shaft being associated with the second frame.

6. The device according to claim 1, arranged in such a manner that the first axis, the second axis, the fourth axis, and the sixth axis are substantially concurrent at a first point, and the first axis, the third axis, and the fifth axis, are substantially concurrent at a second point.

7. The device according to claim 1, wherein the first mechanism is arranged to connect the first shaft to the plate by a Cardan joint.

8. The device according to claim 1, wherein the second mechanism is arranged to connect the second shaft to the control lever by a Cardan joint.

* * * * *